United States Patent [19]

Ferrieu et al.

[11] 4,356,355
[45] Oct. 26, 1982

[54] APPARATUS FOR DETECTING THE CLOSURE OF A SUBSCRIBER'S LINE DURING RINGING

[75] Inventors: Gilbert M. M. Ferrieu, Bievres; Etienne J. R. Osmond; Yves J. F. Hetet, both of Lannion, all of France

[73] Assignee: Telecommunications Radioelectriques et Telephoniques T.R.T., Paris, France

[21] Appl. No.: 207,118

[22] Filed: Nov. 17, 1980

[30] Foreign Application Priority Data

Nov. 21, 1979 [FR] France ............................ 79 28722

[51] Int. Cl.³ ............................................. H04M 3/02
[52] U.S. Cl. ............................................. 179/18 HB
[58] Field of Search ........................ 179/18 HB, 84 A

[56] References Cited

U.S. PATENT DOCUMENTS

| | | | |
|---|---|---|---|
| 4,037,117 | 7/1977 | Carbrey | 307/252 N |
| 4,110,569 | 8/1978 | Schindler et al. | 179/84 A |
| 4,199,664 | 4/1980 | Grange et al. | 179/18 FA |
| 4,262,172 | 4/1981 | Brolin | 179/18 HB |

*Primary Examiner*—Thomas W. Brown

*Attorney, Agent, or Firm*—Thomas A. Briody; William J. Streeter; Laurence A. Wright

[57] ABSTRACT

Apparatus for detecting the closure of a subscriber's telephone line in the presence of an alternating ringing voltage superimposed on a direct voltage comprises circuitry for producing a unidirectional current from the combined alternating and direct voltages. When the line is open no direct current will flow and hence the peak value of successive half cycles will be equal whereas when the loop is closed and direct current flows the peak values of successive peaks will be different. A capacitor (26) is charged by a voltage ($U_1$), which is proportional to the combined voltage, through a transistor (24), provided that the voltage ($U_1$) is greater than the voltage across the capacitor, and discharged through a resistor (27). The time constant of the discharge circuit is selected so that when the line is looped the smaller peak is lower than the voltage to which the capacitor is discharged and hence charging current flows into capacitor (26) on alternate peaks of the voltage ($U_1$) only. The intervals between pulses of charging current are determined by a comparator (33) which provides an output (S) which indicates whether the subscriber's line is closed.

4 Claims, 3 Drawing Figures

APPARATUS FOR DETECTING THE CLOSURE OF A SUBSCRIBER'S LINE DURING RINGING

The invention relates to apparatus for detecting the closure of a subscriber's telephone line during the ringing period, the line being fed during this period with an a.c. ringing voltage and a d.c. voltage.

BACKGROUND OF THE INVENTION

Telephone installations include apparatus for detecting the lifting of the handset of a telephone set connected to the subscriber's lines. This apparatus being arranged in the interface circuits between the exchange and the subscriber's lines. Lifting the handset produces a closure of the subscriber's line and this closure can be detected by checking whether a d.c. voltage which is applied to the subscriber's line causes a direct current to circulate in the subscriber's line. It is comparatively easy to detect the closure of the subscriber's line if the subscriber's line receives only a d.c. voltage. However, there are some problems in detecting the direct current when the subscriber's line receives the a.c. ringing voltage superimposed on this d.c. voltage, since the ringing voltage has a low frequency (for example, 50 Hz) and generates a comparatively high current in the subscriber's line during closure of the line. The ringing voltage may be, for example 70 V r.m.s. It should also be noted that the apparatus must function correctly in the presence of parasitic currents in the subscriber's line, such as longitudinal currents or leakage currents between the two wires of the line.

Conventional apparatus for detecting the closure of a subscriber's line have been implemented by means of relays which have for their purpose the detection of the direct loop current and are relatively intensitive to the alternating ringing current. These relays are rather bulky, costly, difficult to adjust and not compatible with contemporary electronic equipment.

Swiss Pat. No. 526,893 describes a device which compares the time intervals during which the subscriber's line current is higher or lower than a certain threshold value. From this comparison it is possible to deduce whether the current in the subscriber's line, which varies with the frequency of the ringing voltage includes a direct loop current. This rather complicated device has, however, the disadvantage that it is rather sensitive to the frequency and amplitude characteristics of the ringing current and to various parasitic currents in the subscriber's line.

It is an object of the present invention to provide a novel device for detecting the closure of a subscriber's line during ringing which mitigates the above-mentioned drawbacks.

SUMMARY OF THE INVENTION

A device for detecting the closure of a subscriber's telephone line during the ringing period, the line being fed during the ringing period with an a.c. ringing voltage and a d.c. voltage, comprises means for forming a signal which is representative of the absolute value of the current in the subscriber's line, the signal comprising cyclically varying unidirectional voltages having substantially equal peak values caused by the a.c. voltage when the line is open and unequal peak values caused by the superimposed d.c. voltage when the line is closed; a capacitor; means for charging the capacitor when the voltage across the capacitor is less than the instantaneous value of the signal; means for discharging the capacitor when the voltage across the capacitor is greater than the instantaneous value of the signal; and means for producing a loop closure detection signal from a characteristic of the charging current for the capacitor; wherein the time constant of the discharging means is such that when the line is closed the voltage across the capacitor falls by less than the difference between the higher and lower peak values so that the capacitor is not charged when the lower peak value occurs.

In this specification the absolute value of an alternating current or voltage means the magnitude of the current or voltage without reference to its sign, for example that current or voltage obtained by full wave rectification of the alternating signal.

With this device the period of the pulses of the charging current of the capacitor is equal to T or (T/2), depending on whether the subscriber's line is closed or not closed, so that it is very simple to detect closing of the subscriber's line by measuring a period of time which corresponds to the interval between these pulses or to the period of these pulses and by checking whether this time exceeds a certain threshold.

BRIEF DESCRIPTION OF THE DRAWINGS

The following description, which is given by way of non-limitative example with reference to the accompanying drawings will explain how the invention can be put into effect wherein.

DETAILED DESCRIPTION OF THE PREFERRED EMBODIMENTS

Figure 1:
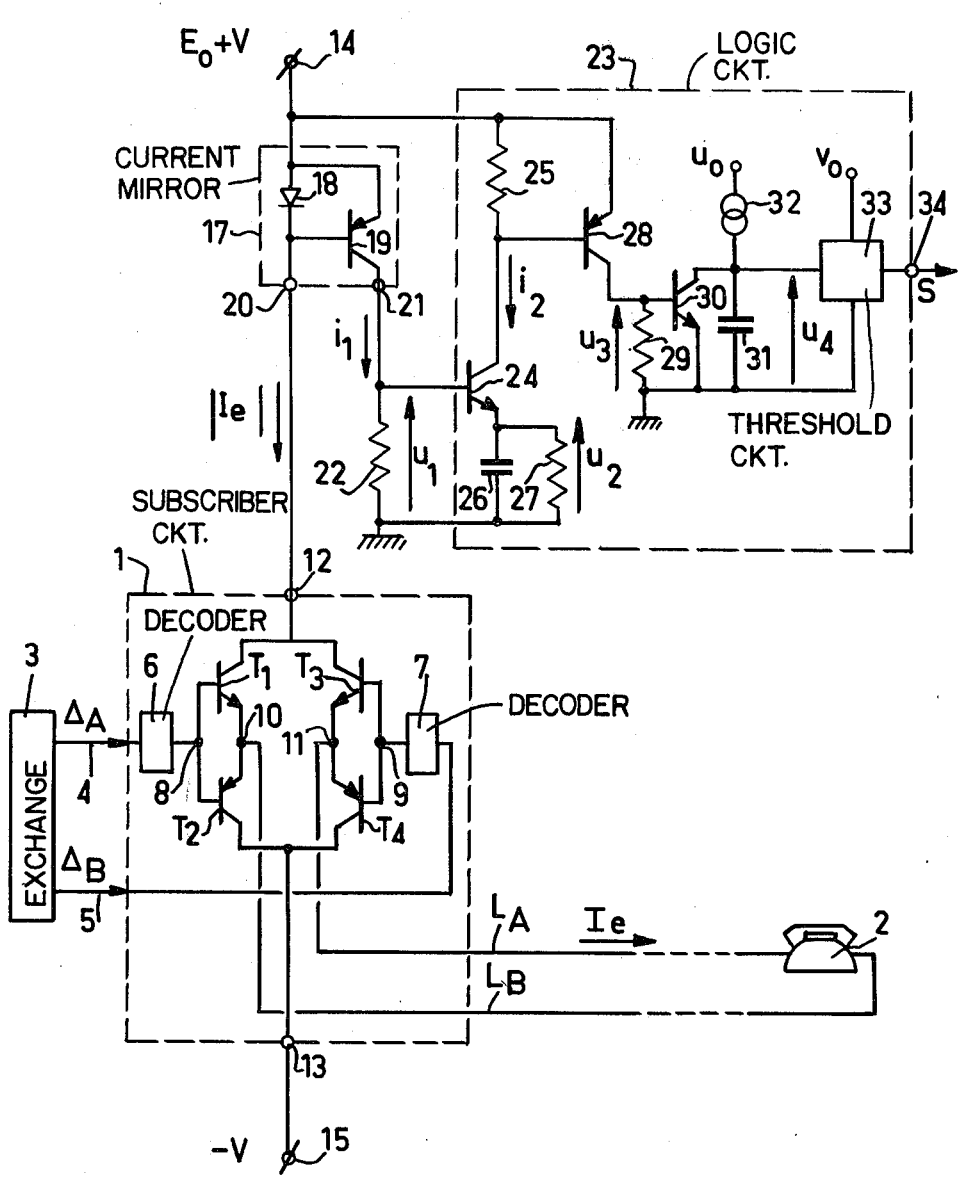
FIG. 1 shows a circuit diagram of apparatus according to the invention.

FIG. 1 shows apparatus according to the invention associated with a subscriber's circuit 1, which is intended to supply a subscriber's set 2 through the two wires $L_A$ and $L_B$ of a subscriber's line. When the subscriber is called under a command from an exchange 3, the subscriber's circuit 1 applies between the two wires $L_A$ and $L_B$ a.c. voltage pulse trains which have a value of, for example, approximately 70 Vrms and a frequency of 50 Hz and which are used to excite ringing of the telephone set.

When the called subscriber lifts the handset, the subscriber's line is closed and, in order to be able to detect this closure during the ringing voltage pulse trains it is customary to apply to the subscriber's line, together with the ringing voltage, a d.c. voltage which will not produce a direct current circulation in the subscriber's line until this line is closed by the lifting of the handset.

Supplying the subscriber's line with the a.c. ringing voltage on which a d.c. voltage is superimposed may be effected in several ways, which are known per se: a conventional means is the use of a transformer whose primary winding is fed with a voltage having the frequency $f = (\omega/2\pi)$ of the ringing voltage and whose two secondary windings, which produce the voltages of the amplitude V, are connected to the wires of the line $L_A$ and $L_B$, respectively, and also to ground via a d.c. voltage source Eo for one of these secondary windings.

Thus, the voltages $V_A$ and $V_B$ which are applied to the two wires $L_A$ and $L_B$ of the line may be at the ringing instant:

$$\begin{cases} V_A = E_o + V \sin \omega t \\ V_B = -V \sin \omega t. \end{cases} \quad (1)$$

As a result thereof the voltage $U_S = V_A - V_B$ applied at the ringing instant between the two wires $L_A$ and $L_B$ of the line is equal to $$U_S = E_o + 2 V \sin \omega t. \quad (2)$$

This voltage comprises a d.c. component having the amplitude $E_o$ equal to, for example, 12 Volts and an a.c. ringing component having an amplitude 2 V equal to, for example, 96 Volts, when V=48 Volts.

The same result can be obtained without the use of a transformer by means of, for example, the subscriber's circuit described in French Pat. No. 2,406,357. By way of example let it be assumed for the following description that the subscriber's circuit 1 is of the type described in this French Patent. During ringing there are applied to two control terminals 4 and 5 of the subscriber's circuit, digital signals $\Delta_A$ and $\Delta_B$, which are obtained in response to the coding by means of delta modulation of signals which have the same shape as the signals $V_A$ and $V_B$ in formula (1). These signals $\Delta_A$ and $\Delta_B$ are converted into analog signals in decoders 6 and 7 and thereafter applied to the input terminals 8 and 9 of a push-pull amplifier which is formed by transistors $T_1$ to $T_4$ which are arranged in the manner shown in FIG. 1. Two output terminals 10 and 11 of this push-pull amplifier are connected to two wires $L_A$ and $L_B$ of the subscriber's line. The push-pull amplifier is supplied with direct current by way of two supply terminals 12 and 13 of the subscriber's line which are connected to terminals 14 and 15, respectively, of a d.c. voltage supply source, not shown. The positive terminal 14 of this source carries a voltage $E_o + V$ with respect to ground and the negative terminal 15 carries a voltage $-V$ with respect to ground. In a subscriber's circuit 1, which is controlled and fed in the above-described manner, the voltage $U_S$ defined by formula (2) is finally obtained between the wires $L_A$ and $L_B$ of the subscriber's line.

Figure 2:
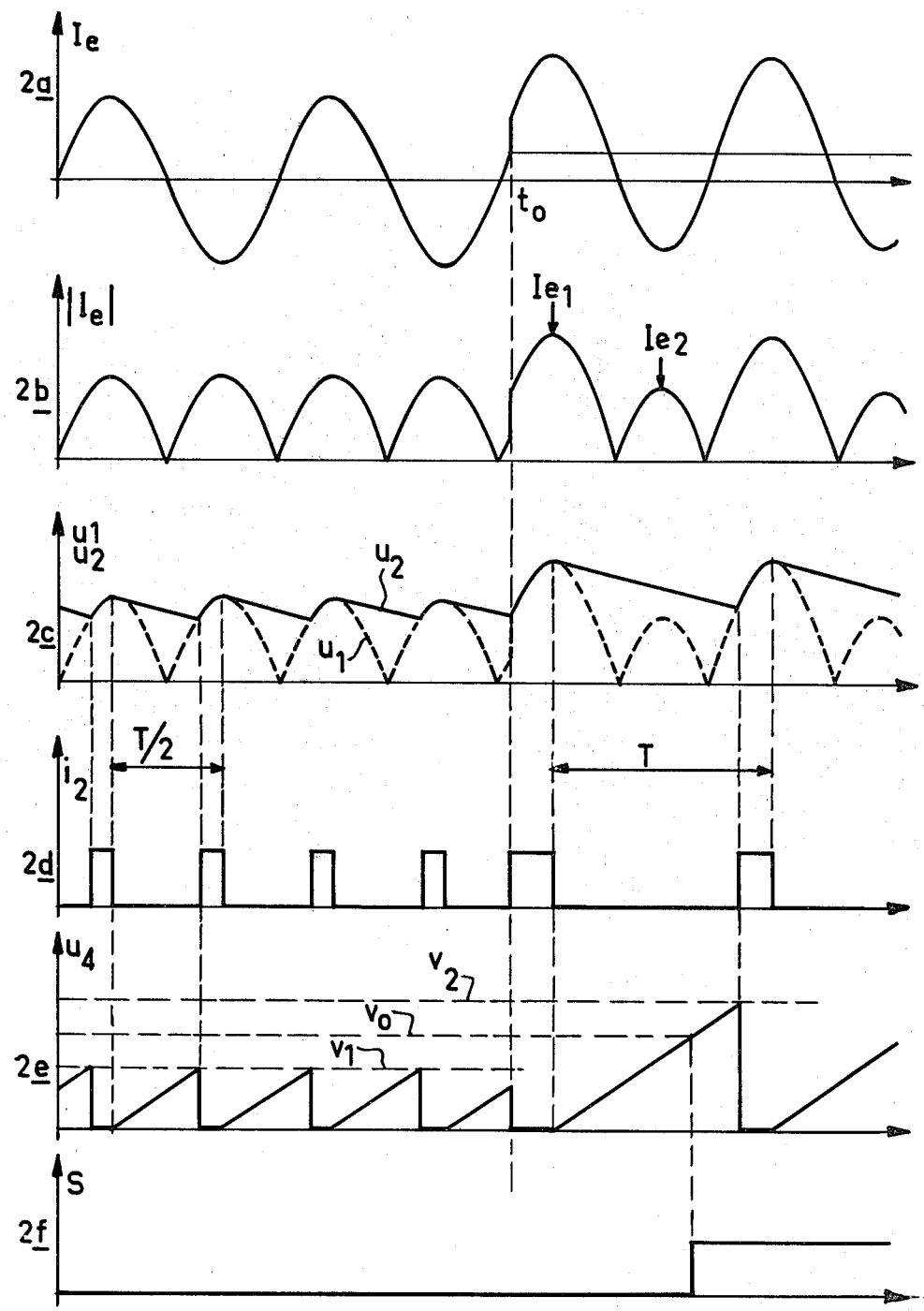
FIG. 2 shows diagrams which illustrate the various signals in the apparatus shown in FIG. 1 and which are intended to illustrate the mode of operation of the device.

Apparatus according to the invention, which has for its function to detect closure of the subscriber's line during ringing is based on the characteristic features of a signal of an absolute value of the current in the subscriber's line, as will be explained with reference to the diagrams 2a and 2b of FIG. 2.

In diagram 2a the current $I_e$ in the subscriber's line during ringing is shown as a function of time, that is to say during the period of time the voltage U defined in formula (2) is applied to this line. As shown by diagram 2a, the current $I_e$ has, up to the instant to where the line is closed, a sinusoidal form having an average value zero because no continuous current can circulate through the subscriber's line. After the instant of the current $I_e$ it has the form of a sine wave with a non-zero average value because of the direct current produced by the d.c. voltage $E_o$. The amplitude of the sinusoidal components of the current $I_e$ prior to and after closure of the subscriber's line is not the same, as the a.c. impedance of the subscriber's line, seen from the subscriber's circuit, is different in these two cases.

The diagram 2b shows the signal $|I_e|$, which represents the absolute value of the current $I_e$ and which can be obtained in practice by full-wave rectification. It is shown that prior to the instant of closing the successive peak values of the signal $|I_e|$ are equal, while in contrast therewith, after the closing instant $t_o$, the successive peak values of the signal $|I_e|$ have alternately a high value $I_{e1}$ and a low value $I_{e2}$.

It is possible to calculate the high peak value $I_{e1}$ and the low value $I_{e2}$. Using the notations of the formula (2) it is possible to write that:

$$|I_e| = \left| \frac{2 V \sin \omega t}{Z_{ca}} + \frac{E_o}{Z_{cc}} \right|$$

where $Z_{ca}$ and $Z_{cc}$ are the a.c. impedance and the d.c. impedance, respectively, of the subscriber's line.

From this it is easy to derive that:

$$\begin{cases} I_{e1} = \dfrac{2V}{Z_{ca}} + \dfrac{E_o}{Z_{cc}} \\ I_{e2} = \dfrac{2V}{Z_{ca}} - \dfrac{E_o}{Z_{cc}} \end{cases}$$

Before the line closes, $Z_{cc} = \alpha$ and consequently $I_{e1} = I_{e2}$.

After the line has closed, $Z_{cc}$ has a finite value and consequently $I_{e1} \neq I_{e2}$ and $I_{e1} - I_{e2} = 2E_o/Z_{cc}$.

According to the invention, to detect closing of the subscriber's line during ringing a signal is used which is representative of the absolute value $|I_e|$ of the current in the subscriber's line and it can be demonstrated with a very simple means that a difference unequal to zero $(I_{e1} - I_{e2})$ between the successive peak values $|I_e|$ exists after closing of the line.

Therefore the device according to the invention comprises means for forming a signal which is representative of the absolute value of the current flowing in the subscriber's line. For the case of the subscriber circuit 1 shown in FIG. 1 such a signal is obtained with little special effort and cost. While the subscriber's line is supplied with the ringing voltage via the push-pull amplifier $T_1$ to $T_4$ a unidirectional current which is equal to the current in the subscriber's line after full-wave rectification and which is therefore equal to $|I_e|$ appears on the supply wires of the subscriber's circuit which interconnects the terminals 14-12 and 15-13. In order to obtain a current $K |I_e|$, which is proportional to $|I_e|$, a well-known circuit 17, called a current mirror, is used which is included between the terminals 12 and 14. In the simplified form shown in the drawing, this current mirror is formed by a diode 18 and a transistor 19, which are connected, as shown in the drawing, to the supply terminal 14, to the input terminal 20 and to the output terminal 21 of the current mirror. The terminal 21 is connected to ground via the resistor 22. In response to the current $|I_e|$ which appears at its input terminal 20, the current mirror 17 produces a current $i_1 = K |I_e|$ at its output terminal 21 and a voltage $u_1$, which is proportional to $|I_e|$, appears at the terminals of resistor 22.

This voltage $u_1$ at the terminals of resistor 22 has the same shape as the current $|I_e|$ shown in diagram 2b and has the same characteristics as explained above as regards its successive peak values, prior to and after closing of the subscriber's line.

This voltage $u_1$, which is proportional to $|I_e|$ is used in the circuit 23 to form a logic signal which indicates closing of the subscriber's line. This will now be further explained.

The voltage $u_1$ is applied in a first stage of a circuit 23 to the base of an npn transistor 24. The collector of this transistor is connected to the positive supply terminal 14 via a resistor 25. Its emitter is connected to ground via a capacitor 26 which has a capacitance C and to whose terminals a resistor 27 which has a resistance value R is connected. The operation of this first stage will be explained with reference to the diagrams 2c and 2d.

In diagram 2c, the voltage $u_1$ which has the same shape as the current $|I_e|$ of diagram 2b is represented by the broken line curve. The solid curve represents the voltage $u_2$ at the terminals of capacitor 26. As the capacitor 26 is connected to the resistor 22 via the base-emitter diode of the transistor 24, the voltage $u_2$ at its terminals follows the voltage $u_1$ during a portion of the ascending edges of $u_1$ until the peak value of $u_1$ has been reached. Above the peak value, at the descending edges of $u_1$, the capacitor 26 does not follow the voltage $u_1$ any longer and discharges through resistor 27. Recharging of the capacitor 26 at the ascending edges of $u_1$ starts from the instants at which the decreasing voltage $u_2$ becomes equal to the voltage $u_1$.

Prior to the instant at which the subscriber's line closes, the successive peak values of the voltage $u_1$ are equal so that during operation the duration of the charging and the discharging cycles of the capacitor 26 is equal to (T/2), T being the period of the ringing voltage. Diagram 2d shows the charging current $i_2$ of capacitor 26, which is substantially equal to the collector current of the transistor 24. Prior to the closure instant $t_o$ this charging current is formed of pulses which are produced with the period (T/2).

After the line closing instant $t_o$ the successive peak values of the voltage $u_1$ are different and by choosing a sufficiently long discharge time constant RC of the capacitor 26 through the resistor 27 it is possible to arrange as will be obvious from diagram 2c, that the decreasing voltage $u_2$ reaches not more than alternate ascending edges of voltage $u_1$. After the line closing instant $t_o$ the duration of the charging and discharging cycles of the capacitor 26 is equal to T and, as shown in diagram 2d, the pulses of the charging current of the capacitor 26 are produced with the period T. The choice of the charging time constant RC is not critical and is not difficult to define; this time constant must be sufficiently large to ensure that during a discharging period (T/2) of capacitor 26 the voltage drop $u_2$ at its terminals does not reach the difference $\Delta u_1$ between two successive peak values of the voltage $u_1$. This difference $\Delta u_1$ is proportional to the difference between the peak currents $I_{e1} - I_{e2}$, which as described above is equal to $(2E_o/Z_{cc})$ and consequently independent of the amplitude 2 V of the ringing voltage applied to the subscriber's line and the ac. impedance $Z_{ca}$ of this line. The device according to the invention detects the closure of the subscriber's line by using the change caused by this closure in the period or in the pulse spacing of the charging current $i_2$ of the capacitor 26, and the result of the foregoing is that this device is in theory not affected by the variations of these values 2 V and $Z_{ca}$.

In the embodiment shown in FIG. 1 the pulses of the charging current $i_2$ are used in the following manner. The resistor 25 through which the current $i_2$ flows is connected between the base and the emitter of the pnp transistor 28. The emitter of this transistor 28 is connected to the positive supply terminal 14 and its collector is connected to ground via a resistor 29. The transistor 28 amplifies the current $i_2$ and produces at its collector a current $i_3$ which generates at the terminals of the resistor 29 a voltage $u_3$ which, but for a proportionality coefficient, has the same shape as the charging current $i_2$ shown in diagram 2d.

The resistor 29 is connected between the base and the emitter of an npn transistor 30, which is driven to the cutoff or saturated state by the voltage $u_3$. A current source 32 which is based on the d.c. voltage $u_o$ produces a constant current which charges a capacitor 31 which constitutes an integrating circuit. The capacitor 31 is connected between the collector and the emitter of the transistor 30. In this manner the capacitor 31 can be charged with a constant current when the transistor 30 is in the cutoff state, whereas it suddenly discharges when this transistor 30 is saturated.

As shown in diagram 2e, the result is that the voltage $u_4$ at the terminals of the capacitor 31 is zero during the pulse durations of the current $i_2$ and that it increases linearly in the time intervals between these pulses. The maximum voltage reached at the end of each of these time intervals is a measure thereof. As, during operation, these time intervals between the current pulses $i_2$ are longer after closing of the line that before closing, the voltage $u_4$ at the terminals of the capacitor 31 reaches, after closing, a maximum value $v_2$, which is higher than its maximum value $v_1$ before line closure.

To detect closing of the subscriber's line, the voltage $u_4$ is applied to the input of a threshold circuit 33, which compares the voltage $u_4$ with a reference voltage $v_o$ having a value between the voltages $v_1$ and $v_2$. Prior to the line closing instant $t_o$ the voltage $u_4$ remains below $v_o$ and the threshold circuit 33 produces at the output 34 of the line closure detection circuit a signal S which is shown in diagram 2f and which has the logic value "0"; after the line closure instant $t_o$, at the instant at which the voltage $u_4$ reaches the reference voltage $v_o$, the signal S changes to the logic "1" state which indicates closure of the subscriber's line. It can be seen that the detection of closure is effected within a period T after the line closing instant $t_o$.

A person skilled in the art will easily understand that instead of using an integrator 31, 32 of the analog type to measure the time interval between the current pulses $i_2$ it is alternatively possible to use a counter which counts clock pulses during these time intervals and which is reset to zero during the current pulses $i_2$. Closure will then be detected when a counting threshold is reached. Instead of measuring the interval between the current pulses $i_2$ it is alternatively possible to measure the period of these pulses which, as shown above, charge from (T/2) before closing to T after closing.

The device according to the invention can be used in a subscriber's circuit of a type other than that shown in FIG. 1, which has only been given by way of a non-limitative example. It is sufficient that in the subscriber's circuit used the subscriber's line is fed during ringing by the a.c. ringing voltage and by a d.c. voltage and that a signal representative of the absolute value of the current in the subscriber's line is formed.

Figure 3:
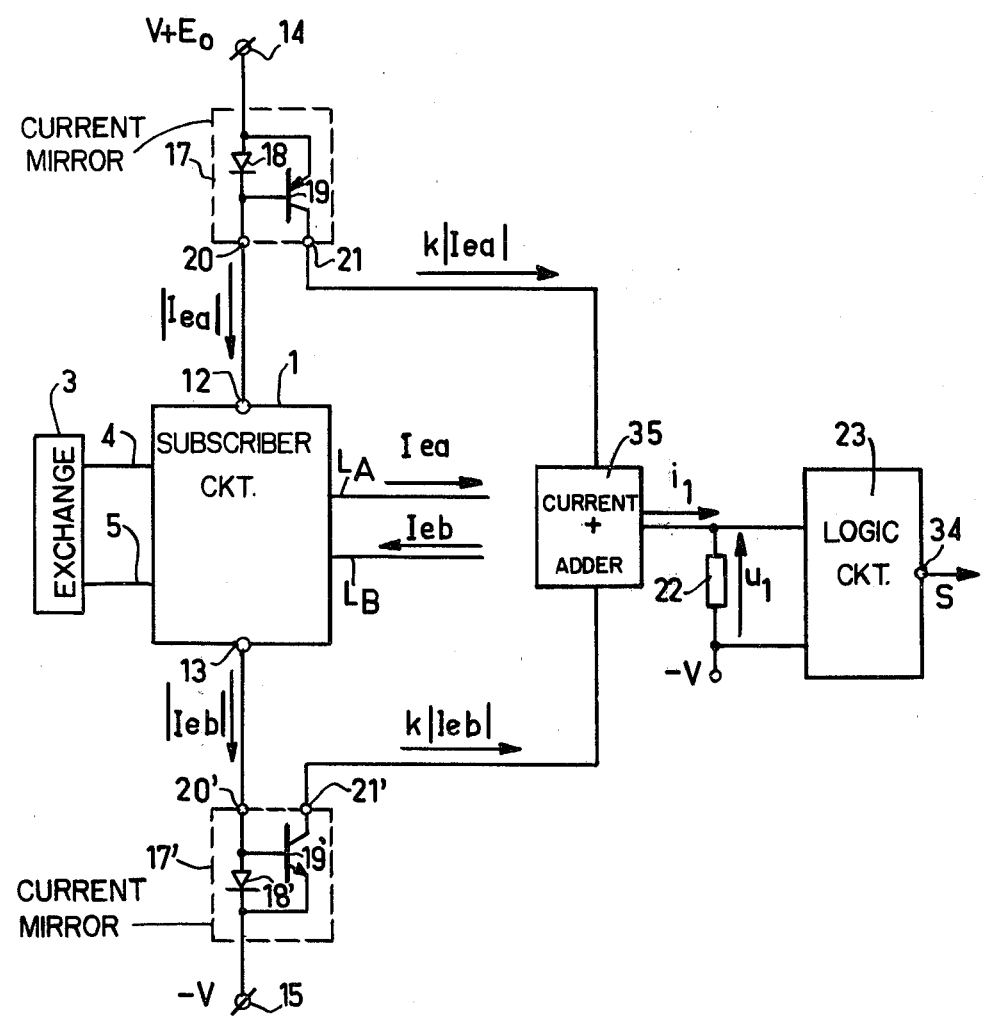
FIG. 3 is a circuit diagram of a variant of the apparatus shown in FIG. 1 according to the invention.

In order to obtain a line closure detecting device which is insensitive to parasitic longitudinal currents in the subscriber's line, it is advantageous to use a device as shown in FIG. 3.

FIG. 3 shows a certain number of elements which are identical to those shown in FIG. 1 and which have been given the same reference numerals. The two wires $L_A$ and $L_B$ of the subscriber's line carry the currents $I_{ea}$ and $I_{eb}$, respectively, which may be different when longitudinal currents are produced inopportunely in the subscriber's line. Let it be assumed by way of example that the subscriber's circuit 1 is of the same type as that shown in FIG. 1. Then a current $|I_{ea}|$, which results from the full-wave rectification of the current $I_{ea}$, flows between the terminal 14 of the supply source and the supply terminal 12 of the subscriber's circuit, and a current $|I_{eb}|$ which results from the fullwave rectification of the current $I_{eb}$ flows between the terminal 15 of the supply source and the supply terminal 13 of the subscriber's circuit. A current mirror 17', which has the same ratio k as the mirror circuit 17 and which is formed by the diode 18' and the transistor 19' is included between the terminals 13 and 15.

In response to the currents $|I_{ea}|$ and $|I_{eb}|$ applied to the input terminals 20 and 20' of the current mirrors 17 and 17', the currents k $|I_{ea}|$ and k $|I_{eb}|$ appear at the output terminals 21 and 21' and are applied to the current adder circuit 35. At the output of the current adder circuit 35 the sum current k $|I_{ea}|$ +k $|I_{eb}|$ is obtained. The longitudinal current components have been suppressed in this sum current. It is then possible to make this sum current identical to the current $i_1$ which, in FIG. 1, flows through the resistor 22. In FIG. 3 the resistor 22 receives the voltage −V. The voltage $u_1$ at the terminals of the resistor 22 is applied to the circuit 23, which may be identical to and have the same function as this circuit in FIG. 1. At its output 34 a logic signal S is obtained which indicates closure of the subscriber's line and which is less affected by longitudinal currents in the subscriber's line.

What is claimed is:

1. A device for detecting the closure of a two wire subscriber's telephone line during the ringing period, the line being fed during the ringing period with an a.c. ringing voltage and a d.c. voltage, comprising:

means for forming a signal which is representative of the absolute value of the current in the subscribers line, said signal comprising cyclically varying unidirectional voltages having substantially equal peak values caused by the a.c. voltage when the line is open and unequal peak values caused by the superimposed d.c. voltage when the line is closed, a capacitor, means for charging said capacitor when the voltage across the capacitor is less than the instantaneous value of said signal, means for discharging said capacitor when the voltage across said capacitor is greater than the instantaneous value of said signal, and means for producing a loop closure detection signal from a characteristic of the charging current for said capacitor, whereby the time constant of said discharging means is such that when the line is closed the voltage across said capacitor falls by less than the difference between the higher and lower peak values so that said capacitor is not charged when the lower peak value occurs.

2. A device as claimed in claim 1, comprising:

a combining circuit which combines two signals which are representative of the absolute values of the currents flowing in the two wires of the subscriber's line in order to suppress the longitudinal current components in the combined signal, said combined signal being the signal used to charge said capacitor in the unidirectional sense.

3. A device as claimed in claim 1 or claim 2, comprising:

means for measuring the time of each interval between successive pulses of the charging currents for said capacitor, and a threshold device for indicating closure of the subscriber's line when this time period exceeds a predetermined value.

4. A device as claimed in claim 1 or claim 2, comprising means for measuring the period of pulses of charging current for the said capacitor and a threshold device to indicate closing of the subscriber's line when this period exceeds a predetermined value.

* * * * *